United States Patent

Mölne

Patent Number: 5,999,811
Date of Patent: Dec. 7, 1999

[54] MOBILE TELEPHONE FOR ROAMING USING DUAL MODE/BAND EQUIPMENT INCLUDING SIM CARDS

[75] Inventor: Anders Mölne, Raleigh, N.C.

[73] Assignee: Ericsson, Inc., Research Triangle Park, N.C.

[21] Appl. No.: 08/602,283

[22] Filed: Feb. 16, 1996

[51] Int. Cl.$^6$ ............................................. H01S 4/00
[52] U.S. Cl. ................. 455/432; 455/436; 455/552; 455/435; 455/558; 379/357
[58] Field of Search ..................... 455/432, 436, 455/552, 435, 558; 379/357

[56] References Cited

U.S. PATENT DOCUMENTS

| | | |
|---|---|---|
| 4,833,701 | 5/1989 | Comroe et al. |
| 5,093,926 | 3/1992 | Sasuta . |
| 5,159,625 | 10/1992 | Zicker . |
| 5,463,675 | 10/1995 | Gerszberg . |
| 5,586,338 | 12/1996 | Lynch et al. . |
| 5,610,919 | 3/1997 | Willard et al. . |
| 5,613,204 | 3/1997 | Haberman et al. . |
| 5,666,650 | 9/1997 | Turcotte et al. . |
| 5,675,628 | 10/1997 | Hokkanen . |

FOREIGN PATENT DOCUMENTS

WO95/23488  8/1995  WIPO .

OTHER PUBLICATIONS

International Search Report re PCT/US97/02122 Date of mailing of search report: Jul. 16, 1997.

*Primary Examiner*—William Cumming
*Attorney, Agent, or Firm*—Burns, Doane, Swecker & Mathis, L.L.P.

[57] ABSTRACT

According to exemplary embodiments of the present invention, mobile stations are provided with a preferred roaming selection list at a predetermined memory location in a subscriber identity module (SIM). The preferred roaming selection list identifies and prioritizes network operators to which that mobile station can be connected. Pointers are provided in the preferred roaming selection list to memory locations in the SIM where lists of networks associated with each entry in the list are stored. The memory locations are specified to be compatible with existing standards. The preferred roaming selection list can be modified over the air interface, e.g., via SMS class 2 messages, or by the user via the keypad of the mobile station.

17 Claims, 2 Drawing Sheets

FIG. 3

| PRIORITY | INFORMATION FIELD | MODE | POINTER |
|---|---|---|---|
| 1 | HOME PLMN | PCS1900 | SIM (6F07) |
| 2 | PREFERRED PLMNs | PCS1900 | SIM (6F30) |
| 3 | HOME SID | AMPS | SIM (XXXX) |
| 4 | ANY OTHER PLMNs | PCS1900 | NONE |
| 5 | PREFERRED SIDs | AMPS | SIM (YYYY) |
| 6 | PREFERRED SIDE (A OR B) | AMPS | SIM (ZZZZ) |
| 7 | ANY OTHER AMPS NETWORK | AMPS | NONE |

FIG. 4

| MODE | POINTER |
|---|---|
| 0 | 6F07 |
| 0 | 6F30 |
| 1 | XXXX |
| 0 | 0000 |
| 1 | YYYY |
| 1 | ZZZZ |
| 1 | 0000 | ns
MOBILE TELEPHONE FOR ROAMING USING DUAL MODE/BAND EQUIPMENT INCLUDING SIM CARDS

RELATED APPLICATIONS

This application is related to U.S. patent application Ser. No. 08/423,942, pending, filed on Apr. 19, 1995 to Eric. J. Turcotte and Rick Brunner, the disclosure of which is expressly incorporated here by reference.

BACKGROUND

The present invention relates generally to radio communications systems and, in particular, to techniques which allow mobile stations to roam in areas having overlapping radio communications systems in which different types of communication systems and/or different frequency bands provide alternative radio communication coverage.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology, e.g., time division multiple access (TDMA) or code division multiple access (CDMA). Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure.

To provide an acceptable level of equipment compatibility, standards have been created in various regions of the world. For example, analog standards such as AMPS (Advanced Mobile Phone System), NMT (Nordic Mobile Telephone) and ETACS and digital standards such as D-AMPS (e.g., as specified in EIA/TIA-IS-54-B and IS-136) and GSM (Global System for Mobile Communications adopted by ETSI) have been promulgated to standardize design criteria for radio communication systems. Once created, these standards tend to be reused in the same or similar form, to specify additional systems. For example, in addition to the original GSM system, there also exists the DCS1800 (specified by ETSI) and PCS1900 (specified by JTC in J-STD-007), both of which are based on GSM.

However, the most recent evolution in cellular communications services involves the adoption of additional frequency bands for use in handling mobile communications, e.g., for Personal Communication Services (PCS) services. Taking the U.S. as an example, the Cellular hyperband is assigned two frequency bands (commonly referred to as the A frequency band and the B frequency band) for carrying and controlling communications in the 800 MHz region. The PCS hyperband, on the other hand, is specified in the United States of America to include six different frequency bands (A, B, C, D, E and F) in the 1900 MHz region. Thus, eight frequency bands are now available in any given service area of the U.S. to facilitate communications services. Certain standards have been approved for the PCS hyperband (e.g., PCS1900 (J-STD-007), CDMA (IS-95) and D-AMPS (IS-136)), while others have been approved for the Cellular hyperband (e.g., AMPS (IS-54)).

Each one of the frequency bands specified for the Cellular and PCS hyperbands is allocated a plurality of voice or speech channels and at least one access or control channel. The control channel is used to control or supervise the operation of mobile stations by means of information transmitted to and received from the mobile stations. Such information may include incoming call signals, outgoing call signals, page signals, page response signals, location registration signals, voice channel assignments, maintenance instructions, hand-off, and cell selection or reselection instructions as a mobile station travels out of the radio coverage of one cell and into the radio coverage of another cell. The control or voice channels may operate in either an analog mode, a digital mode, or a combination mode.

Historically, frequency bands in each cellular service area have been assigned to only one service company. For example, the A frequency band of the Cellular hyperband is usually reserved for use by non-wire line communications service companies, and the B frequency band is usually reserved for use by wire line communications service companies. Thus, if the service company providing cellular service to the subscriber is a wire line company, the Cellular hyperband mobile station is configured with the B frequency band as its "home" frequency band. Reciprocal billing arrangements between service companies allow subscribers to place calls over non-home frequency bands in the event the mobile station is roaming. These non-home calls, however, typically require payment by the subscriber of some form of a surcharge and are therefore undesirable. Furthermore, in the absence of an agreement between service companies, roaming subscribers may not be able to make a call without operator assistance. For the service provider, use of foreign frequency bands by subscribers results in a potential loss of revenue that the provider would like to avoid. Accordingly, cellular hyperband mobile stations have been configured to operate in a particular one of the available frequency bands within the Cellular hyperband.

The expansion to multiple hyperband communications capabilities as a result of the FCC's licensing of the PCS frequency bands has necessitated the development and placement into service of mobile stations that are capable of accessing both the Cellular and PCS hyperbands. To further complicate matters, different standards are being implemented in overlapping networks, e.g., an analog AMPS cellular base station on a first operator's network providing overlapping coverage with a PCS1900 base station connected to a second operator's network. Given this intermingling between standards and communication technologies, the number of different roaming permutations that must be addressed is significantly higher than those presented previously which, for example, only raised the issue of which frequency band to select. Thus, it would be desirable to provide techniques for determining which of a plurality of different types of networks a mobile station should connect with as that mobile station moves between various different types of overlapping service areas. Further, unlike existing roaming solutions, flexibility in re-prioritizing roaming options (both by the subscriber's operator and the subscriber) is desired.

SUMMARY

According to exemplary embodiments of the present invention, mobile stations are provided with a preferred roaming selection list at a predetermined memory location in a subscriber identity module (SIM). The preferred roaming selection list identifies and prioritizes networks (operators) to which that mobile station can be connected, as well as keeping track of network operators to which a mobile station is barred access. For example, in a mobile station which is configured to communicate with either an AMPS type system or a PCS1900 type system, the preferred roaming selection list can include an identification of the home public land mobile network (home PLMN) associated with the PCS1900 system and the home system identification (SID) and the order in which the mobile station should select such operators. This stands in marked contrast to conventional AMPS mobile stations which do not store roaming information in a SIM and to conventional PCS1900 mobile stations which do not provide the flexibility to adjust roaming priorities. Preferred PLMNs and preferred SIDs which can also be utilized for communication services can also be identified and prioritized in the preferred roaming selection list in addition to the home networks.

Using the preferred roaming selection list, a mobile station can determine which of a plurality of different networks that are broadcasting in its current geographical area should be selected for connection. This facility can be used for cell selection, i.e., at power up of the mobile unit, or for cell reselection, i.e., when the mobile unit is roaming between cells belonging to different networks. The mobile station can search for control channels having the identification codes stored at the pointed to locations in the SIM in the order of their priority as set forth in the preferred roaming selection list. In this way, the mobile station will connect with the highest ranked network in the list.

The preferred roaming selection list can be located at a predetermined memory location in the SIM so that this location is readily accessible to both operators and subscribers regardless of the type or manufacturer of the subscriber's operator or using any mobile station equipment. In this way, the selection priority as between both different networks and different systems can be easily changed. Similarly, the pointers used in the preferred roaming selection list can be specified for compatibility with existing SIM standards so that mobile stations operating in accordance with the present invention are also compatible with existing networks and systems and for ease of accessibility to update lists stored at the known memory locations.

The values stored in the preferred roaming selection list can be updated either over the air interface, e.g., by an operator, or by the user interfacing with the SIM via the keypad of the mobile station. For example, this can be accomplished by the operator using SMS class 2 messages.

An object of these various features of the present invention is to provide roaming data associated with any type of system which can be accessed, changed and updated by both the user and the operator (or by the operator on command from the user).

BRIEF DESCRIPTION OF THE DRAWINGS

The foregoing, and other, objects, features and advantages of the present invention will be more readily understood upon reading the following detailed description in conjunction with the drawings in which:

FIG. 3 is a table illustrating a preferred roaming selection list according to an exemplary embodiment of the present invention; and FIG. 4 is an exemplary version of the preferred roaming selection list which can be stored in a SIM according to an exemplary embodiment of the present invention.

DETAILED DESCRIPTION

Figure 1:
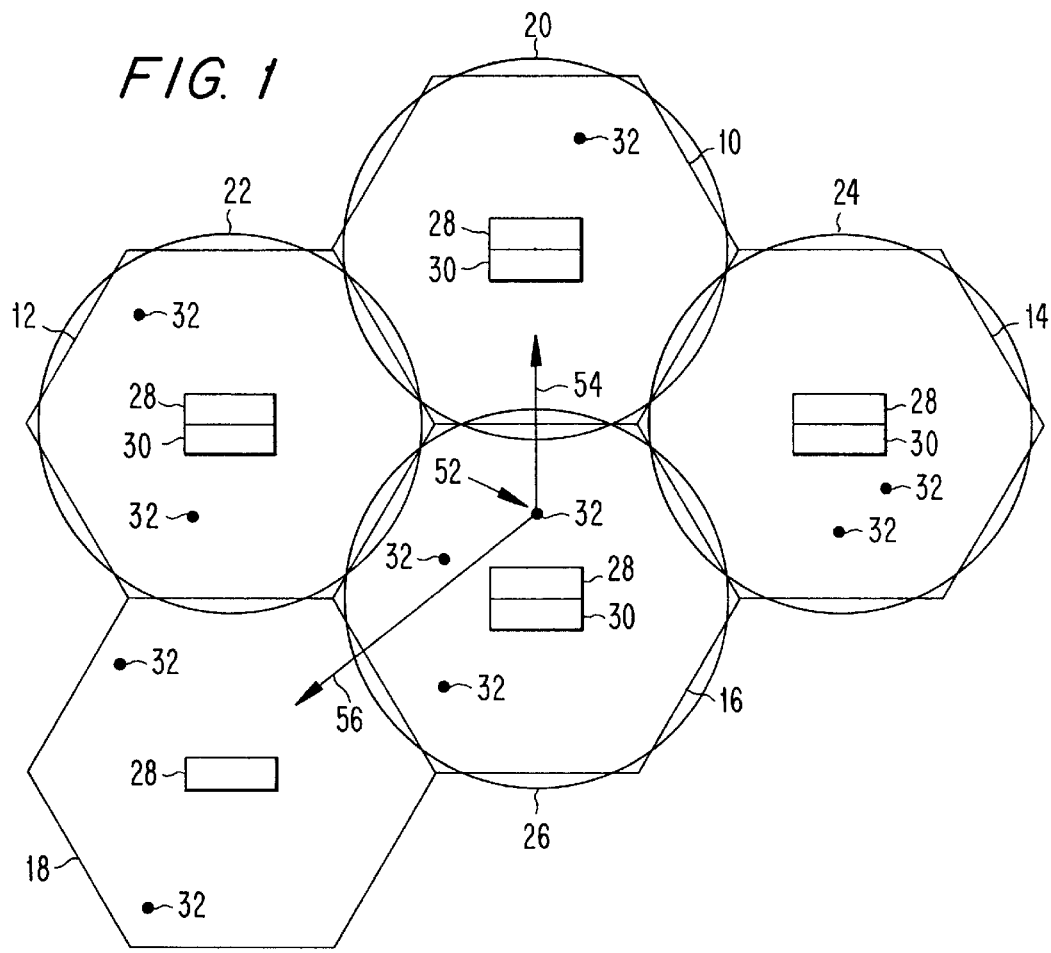
FIG. 1 is a cell diagram illustrating an exemplary cell configuration for a multiple band/mode cellular communications system.

Prior to describing operation of mobile stations according to the present invention, a brief overview of conventional channel acquisition techniques (i.e., cell selection, handover and roaming) will first be described.

Consider first the simplest scenario wherein a mobile station only moves between areas serviced by a single AMPS operator. Then, when in the idle state, a mobile station tunes to and then continuously monitors the strongest control channel at its known frequency (generally, the control channel of the cell in which the mobile station is located at that moment) and may receive or initiate a telephone call through the corresponding base station. When moving between cells while in the idle state, the mobile station will eventually "lose" radio connection on the control channel of the "old" cell and tune to the control channel of the "new" cell. This process is commonly referred to as handover. The initial tuning to, and the change of, control channels are both accomplished automatically by scanning all the control channels at their known frequencies in operation in the cellular system to find the "best" control channel. When a control channel with good reception quality is found, the mobile station remains tuned to this channel until the quality deteriorates again. In this manner, all mobile stations are nearly always "in touch" with the system.

Conventional techniques have also been developed which allow a mobile station to roam between different operators in a single type of system. Consider, for example, a mobile station which roams between geographic areas covered by AMPS base stations operated by different service companies. Each service company broadcasts a unique system identification code (SID) on all paging channels of the frequency sets used to provide service by that service company in a given service area. This way, the mobile station can determine which service company is providing service on a given paging channel by identifying the SID. For example, a mobile station can select the strongest available control channel and determine the SID broadcast on the associated paging channel. If the broadcast SID is the same as the home SID which is stored in the handset, then that mobile station can be connected using the strongest control channel. Otherwise the mobile station will continue to search the control channels to which it can lock (i.e., which have a sufficiently high received signal strength) until the home SID is located or determined to be unavailable. If necessary, the mobile station can then revert to a preferred SID (PSID) if any are specified in the list. The PSID can, for example, be that associated with a service company that has a reciprocal agreement with the service company to which the mobile station has subscribed. If neither the home SID nor any of the preferred SIDS are available, then the AMPS mobile station might opt to lock onto a control channel associated with a preferred frequency band, i.e., the A band or the B band.

Note that the aforedescribed roaming techniques were hard coded into the AMPS mobile stations in a general memory area. This allowed for little or no flexibility in terms of changing either the order in which networks were selected while roaming or the identity of the networks which can be selected while roaming.

A similar solution has been adopted for the GSM standard, albeit at a slightly greater level of specificity. For example, in the PCS1900 network, which is based on GSM specification, the handset is typically preprogrammed, e.g., by the operator storing data in a subscriber identify module (SIM) card, with information as to how that mobile station is to select the network. The SIM was created for GSM as a mechanism to conveniently group and store information elements related to the mobile subscriber.

For example, the identity (IMSI) of the home PLMN associated with a PCS1900 mobile station is stored at SIM memory location 6F07. Similarly, the identities of preferred PLMNs or forbidden PLMNs (if any) are stored at memory locations 6F30 and 6F7B, respectively. These and other attributes of subscriber identity modules are standardized for GSM specified mobile stations in the document entitled "Specification of the Subscriber Identity Module-Mobile Equipment (SIM-ME) Interface", GSM 11.11, Version 4.10.0, dated Jan. 21, 1994, the disclosure of which is incorporated here by reference.

In the PLMN selection process, which is also hard coded into the PCS1900 mobile station like that of AMPS, the mobile station normally looks for cells only in its home PLMN. If no service is available on the home PLMN, then the mobile station will search for a preferred PLMN whose identities are stored at SIM memory location 6F30. If the mobile station locks onto a preferred PLMN, the user can alternatively select another network by commanding the mobile station to make a new network search, assuming that there is a second network covering the geographic area in which the mobile station is currently located which is not identified as a forbidden PLMN at SIM memory location 6F7B. These forbidden PLMNs may be identified by the subscriber's network operator so that the mobile station will not access these other networks (except in the case of emergency 911 calls).

Although the conventional solutions described above are adequate for geographic areas in which only a single type of system is operating or for mobile stations which are only capable of listening to a single type of system, those skilled in the art will appreciate that the evolution of communication systems will gradually render these situations less common and make more frequent the situations where a multi-system capable mobile station will travel through areas serviced by multiple different types of networks. Moreover, the hard-coded priority selection function provided in these conventional mobile stations does not provide the user or the network operator with sufficient flexibility to adjust selection priorities among the many different network operators which will provide alternative service in the communication world of today and beyond. Reference is now made to FIG. 1 wherein there is shown a cell diagram illustrating an exemplary cell configuration having different networks and network operators in which mobile stations and roaming techniques according to the present invention provide numerous beneficial results.

Therein, an arbitrary geographic area is divided into a plurality of cells 10–18 controlled by a first operator or service company and cells 20–26 controlled by a second operator or service company. The first and second operators provide radio communication services utilizing first and second communication standards, respectively. For example, cells 10–18 are represented by hexagrams and comprise communications cells wherein communications are provided via multiple channels according to PCS1900 and using a PCS frequency band. Cells 20–26, on the other hand, are represented by circles and comprise communications cells in which cellular communications are provided to mobile stations via multiple channels according to the AMPS standard in the cellular hyperband.

Each of the PCS1900 operated cells 10–18 includes at least one base station 28 configured to facilitate communications over certain channels in at least one of the six available PCS hyperband frequency bands. Similarly, each of the AMPS operated cells 20–26 includes at least one AMPS base station 30 configured to facilitate communications over certain channels in at least one of the two available AMPS frequency bands. It will, of course, be understood that each cell 10–18 and each cell 20–26 may include more than one base station 28 and 30, respectively, if for example, different service companies are providing cellular communications services on different frequency bands within the same cell.

The base stations 28 and 30 are illustrated as being positionally located at or near the center of each of the cells 10–18 and 20–26, respectively. However, depending on geography and other known factors, either or both of the base stations 28 and 30 may instead be located at or near the periphery of, or otherwise away from the centers of, each of the cells 10–18 and 20–26. In such instances, the base stations 28 and 30 may broadcast and communicate with mobile stations 32 located within the cells 10–18 and 20–26 using directional rather than omni-directional antennas. Each one of the base stations 28 and 30 includes a plurality of transceivers connected to one or more antennas in a manner and with a configuration well known in the art.

There are a number of mobile stations 32 shown operating within the service areas illustrated in FIG. 1. These mobile stations 32 each possess the requisite functionality for operating in both the cellular frequency bands and the PCS frequency bands (i.e., they are multiple hyperband communications capable) and are capable of operating in different modes, e.g., analog or digital modulation, according to AMPS or PCS1900, etc. The configuration and operation of the mobile stations 32 will be described in more detail herein with respect to FIG. 2.

Figure 2:
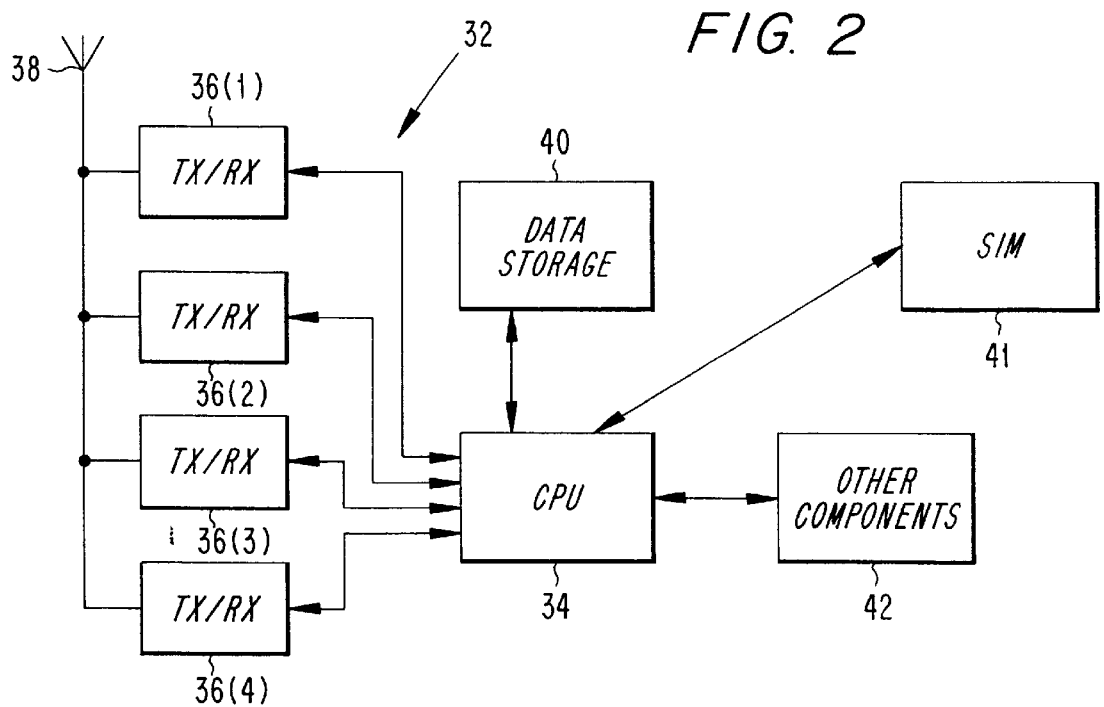
FIG. 2 is a simplified block diagram of a multiple hyperband/mode mobile station programmable with hyperband and frequency band selection criteria in accordance with the present invention.

Reference is now made to FIG. 2 wherein there is shown a simplified block diagram of a multiple hyperband, multiple mode mobile station 32 according to an exemplary embodiment of the present invention. The mobile station 32 includes a processor (CPU) 34 connected to a plurality of transceivers 36. The transceivers 36 are each configured to operate in the frequency bands and channels of a different hyperband. For example, the transceiver 36(1) functions on multiple channels in at least one of the frequency bands of the 800 MHz frequency range, and is thus utilized by the mobile station 32 for communicating over the cellular hyperband. The transceiver 36(2), on the other hand, functions on multiple channels in at least one of the frequency bands of the 1900 MHz frequency range, and is thus utilized by the mobile station 32 for communicating over the PCS hyperband. The remaining transceivers 36(3) and 36(4), if included, function in other frequency ranges; for example, comprising those additional frequency ranges identified by the FCC for other soon to be made available hyperbands. Those skilled in the art will appreciate that an exemplary embodiment of the present invention can include only transceivers 36(1) and 36(2) to reduce the cost of the unit. Alternatively, it may be possible to use one transceiver capable of operating in either band, e.g., 800 MHz or 1900

MHz. By means of an output signal from the processor 34, the frequency band and precise channel therein on which the transceivers 36 operate for communications may be selected. Additionally, each transceiver can be adapted as a dual mode analog/digital transceiver. Such devices are described, for example, in U.S. patent application Ser. No. 07/967,027, entitled "Multi-Mode Signal Processing" to Paul W. Dent et al and filed on Oct. 27, 1992, the disclosure of which is incorporated here by reference. In this way, each of the mobile stations 32 can communicate with different types of networks which it may encounter while roaming, e.g., PCS1900 and AMPS.

An antenna 38 is connected to the transceivers 36 for transmitting and receiving radio communications (both voice and data) over the cellular communications network utilizing, for example, the base stations 28 and 30 of FIG. 1. A data storage device 40 (preferably in the form of a read only memory—ROM—and a random access memory—RAM) is also connected to the processor 34. The data storage device 40 is used for storing programs and data executed by the processor 34 in controlling operation of the mobile station 32. Another memory device 41, commonly referred to as a subscriber identity module (SIM) is also connected to CPU 34, the functionality of which is described below. There are other components 42 included in the mobile station 32 (like a handset, keypad, etc.) and not specifically shown in FIG. 2 whose nature, operation and interconnection with the illustrated components are well known to those skilled in the art.

Of particular interest herein is the operation of mobile stations as described above when roaming among geographic areas which include the service areas of many different types of radio communication systems. For example, the manner in which the mobile station 32 will select between a PLMN supported by base station 28 in cell 16 and the AMPS operator supported by base stations 30. The more network operators that are added to the scenario, the more complicated (and the more important) the selection process becomes.

According to an exemplary embodiment of the present invention, this problem is overcome by providing a preferred roaming selection list in SIM 41 of each multimode/multihyperband mobile stations 32. An example of the preferred roaming selection list is illustrated in FIG. 3. The preferred roaming selection list specifies the selection sequence for the mobile station 32 as it roams throughout various geographic areas. The exemplary list provided in FIG. 3 has seven different priority fields, the first of which identifies the home PLMN associated with the operator to which this particular mobile station 32 subscribes. Although the list illustrated in FIG. 3 has explanatory columns indicating "Priority" and "Information Field", these columns need not actually be stored in SIM 41 since they will be implicit in the order of the list and pointers, respectively. Accordingly, the preferred roaming selection list actually stored at the predetermined location in SIM 41 can include, for example, 1–7 entries each of which has one mode bit (or more if more than two modes are listed) and an address pointer. An example of the information which might actually be stored in SIM 41 as the preferred roaming selection list is shown in FIG. 4, where mode=1 represents PCS1900 and mode=0 represents AMPS. Of course more mode bits can be used to expand the capabilities of the preferred roaming selection list beyond two modes.

Thus, the identity of the home PLMN is stored at memory location 6F07 of SIM 41. The identity stored at memory location 6F07 is the international mobile subscriber identity (IMSI). The IMSI is used both for the mobile station to identify its home PLMN and for the mobile to transmit as its own identity. In the second row of the table illustrated in FIG. 3, the preferred PLMNs are pointed to at memory location 6F30 in SIM 41. These identities can, for example take the form of a list having a number of values of the form (PPPQQQ$_1$), (PPPQQQ$_2$) . . . (PPPQQQ$_n$) where PPP are three digits representing the mobile country code (MCC) and QQQ are three digits representing the mobile network code (MNC). Thus, for this dual mode mobile station 32, the preference is to connect with either a home or preferred PLMN in the GSM network prior to any network in the AMPS system.

If, however, neither the home PLMN or any of the identified preferred PLMNs are located in a geographic area that the mobile station 32 finds itself, the third highest priority operator is that of the home SID for the AMPS system. The home SID value is stored at SIM memory location XXXX. This SIM memory location is designated as XXXX rather than an absolute address since it can be any memory location in SIM 41 which is not currently specified for some other purpose, e.g., in the aforedescribed GSM specification 11.11. Alternatively, the home SID can be stored directly in the preferred roaming selection list without a pointer because there is only one home SID associated with each mobile station 32 or the home SID can be stored in regular memory 40.

Next, in the fourth row of the table of FIG. 3, the mobile station will look for any other PLMN which may be active in that geographic area and which is not a barred PLMN identified at memory location 6F7B of the SIM 41. Again, no pointer is needed here since no particular PLMNs are being identified. At row 5 of the table of FIG. 3, preferred SIDs are pointed to at SIM memory location YYYY. Like row 3, this new SIM memory location is designated YYYY since its absolute address has not yet been specified. However, the memory location adopted for this function should be standardized so that all operators and manufacturers are able to readily adjust the identification of preferred SIDs for each mobile station 32 as described below. Alternatively, PSIDs can be stored in regular memory 40.

The next highest priority designated in the exemplary preferred roaming selection list of FIG. 3 is that of the system side (A or B) which is preferred for this mobile station. Thus, failing to find any allowable PLMN or any of the home SID or preferred SIDs, the mobile station can still connect to a network on the preferred frequency band. The identity of the preferred frequency band can be stored at a new SIM location ZZZZ. Alternatively, no pointer need be provided for this entry since the preferred side can be directly stored in the table itself. If the user has not selected a system side, then the table entry will be used as the default. As a third alternative, the preferred band can be stored in regular memory 40.

If the mobile station identifies another PLMN or AMPS network in rows 4 and 7, respectively, then it will first check to see if the identified PLMN or AMPS network is one to which that mobile station is barred access. The barred PLMNs are identified in a list provided at SIM memory location 6F7B. Similarly, the barred SIDs for the AMPS type systems can be identified in a list provided at SIM memory location AAAA. Like that of row 5, this new SIM memory location should be one which is not used for any other purpose and which can be standardized for this functionality so as to be readily available to any number of system operators and/or handset manufacturers. Alternatively, the list of barred SIDs can be stored in regular memory 40.

One of the advantages of storing information regarding roaming priorities in SIM 41 is that the priorities of the various networks' identities can be altered by either the operator or the user in any manner desired. For example, an operator can program or reprogram the preferred roaming selection list over the air interface using short message service (SMS) class 2 messages. An SMS class 2 message is a message sent to the SIM which the mobile station will store in the SIM memory area designated in the message. The mobile station will send a reply to the network indicating receipt of the SMS class 2 message. This feature is desirable since, for example, roaming agreements between operators tend to change over time.

Thus, according to exemplary embodiments of the present invention, at least one and preferably five new memory areas (i.e., memory areas which have not previously been defined by GSM 11.11) could be defined on the SIM 41. As described above, these memory areas should not interfere with the existing memory areas to provide optimal compatibility. If preferred SIDs and barred or restricted SIDs are not supported by the mobile station 32, then at least one new memory area on the SIM card is to be defined where the preferred roaming sequence list itself is stored.

Although the foregoing exemplary embodiment has focussed on a dual mode and dual band mobile station that is connectable to AMPS type networks or PCS1900 type networks, those skilled in the art will readily appreciate that this is simply one example of a multimode/band mobile station. Any combination of standards, such as GSM, DSC1800, PCS1900, AMPS, D-AMPS, NMT and ETACS, can be made and provided with a preferred roaming selection list according to the present invention. For example, a dual band handset could be implemented which is operable either according to PCS1900 in the cellular frequency bands or GSM in the PCS frequency bands.

Of course, those skilled in the art will appreciate that the list illustrated in FIG. 3 is only one example of preferred roaming selection lists according to the present invention. For example, the list can have any desired number of entries and can refer to more than two different types of networks.

Those skilled in the art will also appreciate that the preferred roaming selection list described above has other advantages when used in dual mode and/or dual band mobile stations. For example, a dual mode PCS1900/AMPS mobile station according to the present invention is not required to have a home SID as are conventional AMPS only mobile stations. If the dual mode mobile station includes separate AMPS and PCS1900 systems, then the AMPS part of the mobile station would be activated separately from the PCS part of the mobile station. Nonetheless, mobile stations according to the present invention would still be able to roam as an AMPS mobile station even though it doesn't have a home SID.

The above-described exemplary embodiments are intended to be illustrative in all respects, rather than restrictive, of the present invention. Thus the present invention is capable of many variations in detailed implementation that can be derived from the description contained herein by a person skilled in the art. For example although the present invention has been described with respect to operation in the Cellular and PCS hyperbands, it will be understood that the disclosed invention may be implemented in and across any of a number of available hyperbands. All such variations and modifications are considered to be within the scope and spirit of the present invention as defined by the following claims.

What is claimed is:

1. A mobile station which can communicate with at least one first type of radio communication network that uses digitally modulated radio signals and at least one second type of radio communication network that uses analog modulated radio signals, said mobile station comprising:

a transceiver for transmitting and receiving both analog and digitally modulated signals;

a subscriber identity module (SIM) for storing a roaming selection list at a first predetermined memory location, said roaming selection list including:

a first entry including a first pointer to a second predetermined memory location in said SIM wherein an identity of a home network of said first type is stored;

a second entry including an identity of a home network of said second type; and a third entry including a second pointer to a third predetermined memory location in said SIM wherein at least one identity of other networks of said first type are stored;

wherein said first, second and third entries are ordered in said roaming selection list according to their respective selection priority; and a processor for scanning control channels associated with networks which provide radio communication coverage in an area in which said mobile station is currently located, wherein said processor selects a highest priority network pointed to by said roaming selection list that is available in said area.

2. The mobile station of claim 1, wherein said first type is GSM specified networks and said second type is AMPS specified networks.

3. The mobile station of claim 2, wherein said identity of a home network of said first type is contained in an international mobile station identification (IMSI).

4. The mobile station of claim 2, wherein said identity of a home network of said second type is home system identification (SID).

5. The mobile station of claim 2, wherein said at least one identity of other networks of said first type are identities of preferred PLMNs.

6. The mobile station of claim 1, wherein said second predetermined memory location is 6F07 and said third predetermined memory location is 6F30.

7. The mobile station of claim 1 wherein said roaming selection list further includes:

a fourth entry indicating a priority of networks of said first type other than those pointed to by said first and second entries.

8. The mobile station of claim 6, wherein said roaming selection list further includes:

a fifth entry including a third pointer to a fourth predetermined memory location in said SIM wherein at least one identity of other networks of said second type are stored.

9. The mobile station of claim 8, wherein said roaming selection list further includes:

a sixth entry which identifies a preferred system side of networks of said second type.

10. The mobile station of claim 9, wherein said roaming selection list further includes:

a seventh entry including a fourth pointer to a fifth predetermined memory location in said SIM wherein at least one identity of networks of said first type to which said mobile station is barred access are stored.

11. The mobile station of claim 10, wherein said fifth predetermined memory location is 6F7B.

12. The mobile station of claim 10, wherein said roaming selection list further includes:

an eighth entry including a fifth pointer to a sixth predetermined memory location in said SIM wherein at least one identity of networks of said second type to which said mobile station is barred access are stored.

13. The mobile station of claim 1, wherein said order of said first, second and third entries is other than first, second and third.

14. The mobile station of claim 1, further comprising:

means for updating any one of said roaming selection list via information received by said transceiver.

15. The mobile station of claim 1, further comprising:

means for updating said roaming selection list via information input by a user of said mobile station.

16. A mobile station which can communicate with different types of radio communication networks, said mobile station comprising:

a transceiver for transmitting and receiving both analog and digitally modulated signals;

a subscriber identity module (SIM) for storing a roaming selection list at a first predetermined memory location, said roaming selection list including:

a first pointer to a second predetermined memory location in said SIM wherein an identity of at least one network of a first type is stored; and a second pointer to a third predetermined memory location in said SIM wherein an identity of at least one network of a second type is stored;

wherein said first and second pointers are ordered in said roaming selection list according their respective selection priority;

a processor for scanning control channels associated with networks which provide radio communication coverage in an area in which said mobile station is currently located, wherein said processor selects a highest priority network pointed to by said roaming selection list that is available in said area.

17. The mobile station of claim 16, wherein said first type of network is an AMPS specified network and said second type of network is a GSM specified network.

* * * * *